United States Patent [19]
Radzhabov

[11] 3,809,360
[45] May 7, 1974

[54] FLAT DIRECT-FLOW GATE VALVE

[76] Inventor: Nadir Asker Ogly Radzhabov, Ulitsa Ryleeva 36-a, kv. 3, Baku, U.S.S.R.

[22] Filed: Apr. 23, 1973

[21] Appl. No.: 353,613

[52] U.S. Cl.................. 251/196, 251/168, 251/202
[51] Int. Cl............................................. F16k 3/10
[58] Field of Search .......... 251/167, 168, 175, 194, 251/195, 196, 202

[56] References Cited
UNITED STATES PATENTS

| | | | |
|---|---|---|---|
| 2,861,770 | 11/1958 | Bredtschneider | 251/167 |
| 2,977,086 | 3/1961 | Heinen | 251/167 |
| 3,434,692 | 3/1969 | Tillman | 251/202 |
| 3,658,087 | 4/1972 | Nelson | 251/175 X |

Primary Examiner—Harold W. Weakley
Attorney, Agent, or Firm—Eric H. Waters

[57] ABSTRACT

The gate valve comprises a flow control assembly including a gate member made up by two identical parts, the gate member being mounted between two shields associated with seats and rolling-contact guides.

Each guide includes a spherical retaining means and a smoothly narrowing slit between the internal edges of the parts of the gate member, at both sides of the latter.

With the gate member being in either of the two extreme working positions thereof, the spherical retaining means is positioned in the respective narrowing portions of the slit, biasing the two identical parts of the gate member apart and pressing them against the respective seats of the flow control assembly of the gate valve.

2 Claims, 4 Drawing Figures

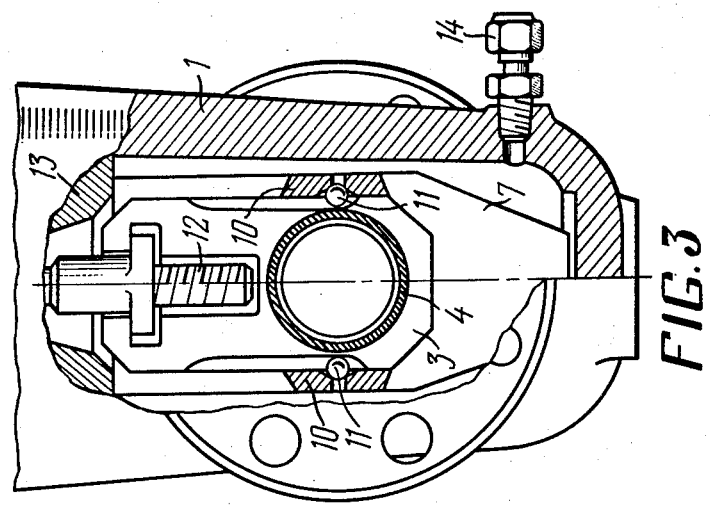
FIG. 3
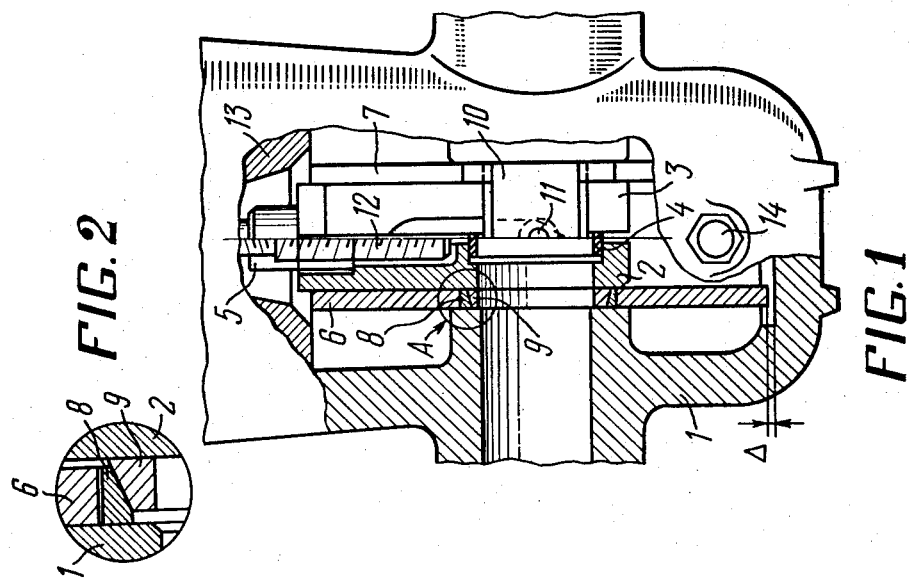
FIG. 2
FIG. 1

FLAT DIRECT-FLOW GATE VALVE

The present invention relates to valve means adapted to be mounted in flow conduits, pipelines, etc., and, more particularly, it relates to flat direct-flow gate valves employed in various industries, such as oil and petrochemical industries, natural gas industry, chemical industry, etc.

There is known a variety of flat direct-flow gate valves produced by Soviet manufacturers, as well as by foreign ones, such as "WKM," "OCT," "Newman McEvoy" and "Cameron." The flow control assemblies of the gate valves produced by these manufacturers have a similar general design. These are mounted in the housing of the gate valve, between the sealing surfaces adjoining the flow opening, a flow control assemblies including gate members with flat-parallel closure surfaces, protective shields defining guides for the reciprocation of the gate members, seats with sealing elements (e.g., made of fluoroplastics, viscous-plastic pastes, etc.), biasing means (e.g., various kinds of springs, wedges, etc.) and a lead screw-nut couple for effecting reciprocation of the gate members within the housings of the gate valves.

Although having numerous advantageous properties, the known gate valves are not entirely free, however, from a series of drawbacks, among which there are strict requirements as to the accuracy of the manufacturing of the component parts and the necessity of having additional elements for ensuring dependable fluid-tightness of the flow control member, such as springs, sealing pastes of specific compositions, etc.

To provide for adequate fluid-tightness of the flow control assemblies at relatively low pressures of the fluid being controlled, the gate valves manufactured by "Newman McEvoy" and "OCT" have a sealing paste of specific compositions injected into the sealing means of the flow control assembly and, in addition to that, incorporate extra-rigid springs of specific structure biasing together the components of the flow control assembly, i.e., the gate and the seats. In gate valves manufactured by "Cameron" adequate fluid-tightness of the flow control assembly at relatively low pressures of the fluid being controlled is attained by precise machining and lapping-in of the respective sealing surfaces of the gate and of the seats made, respectively, of a metal and a resiliently-plastic material.

Furthermore, a disadvantage practically common to all the abovementioned gate valves arises from the fact that as the sealing surfaces of the gates and of the seats get either worn out or corroded in operation, the gate valves fail to exert their fluid control action, since they are devoid of a wedging mechanism that should press the gates to the seats by the effort received from the screw-nut couple and thus provide additional contact effort for adequate fluid-tightness of the flow control assembly.

The last-specified disadvantage is not to be found in gate valves manufactured by "WKM," since in these valves the gate member is made up by two non-identical parts, or halves having each a V-shaped cutaway portion acting as a wedge means, the two halves being interconnected by springs of a specific design, mounted at the sides of the gate member.

Considering that one of these two halves is the driving one and the other half — the driven one, the manufacturer (i.e., "WKM") suggests that the valves should be used as single-directional ones, to ensure their faultless performance. It should be noted that the same restriction is applied to the gate valves manufactured by "OCT", since they incorporate a disc spring (a Belleville spring) mounted at one side of the gate member.

Thus, it can be seen that the majority of the known gate valves have their flow control assemblies incorporating spring means for various purposes, the spring means being apt after a certain operational period to lose at least partly their initial rigidity, on account of corrosion, wear, creep of their material, elevated temperatures of the fluid, etc., which amounts to the gate valves either having the reliability of their performance affected, or failing to operate altogether.

It is an object of the present invention to create an all-purpose flat direct-flow gate valve that should combine high reliability with simplicity of manufacture and operation.

It is another object of the present invention to create a flat direct-flow gate valve having a reduced weight and requiring minimal labour for its manufacture.

These and other objects are attained in a flat direct-flow gate valve with a flow control assembly, comprising a housing having a flow opening, a gate member made up by two identical parts, or halves and a centering sleeve, the gate member being mounted for reciprocation within the housing, and protective shields having seat means defined by pressure rings and sealing rings mounted between the gate member and the housing, in which gate valve, in accordance with the invention, the gate member is associated with rolling-contact guide means defined by spherical retainer means supported by said protective shields and slits between the internal edges of the halves of the gate member, the slits smoothly narrowing toward the ends thereof corresponding to the respective extreme operational positions of the gate member, in which positions the retained means bias the two halves of the gate member apart, whereby these halves engage their respective seats ensuring adequate fluid-tightness of the flow control assembly of the valve.

According to an embodiment of the invention, the protective shields have mounted therein thrust strips each provided with a socket freely receiving therein a spherical retaining means in the form of a ball, each slit between the internal edges of the halves of the gate member being defined by recesses cut in these internal edges of these halves of the gate member, the length of each such recess corresponding to the full working stroke of the gate member, the depth of these recesses gradually diminishing toward the ends thereof, which amounts to narrowing of the slits between the two halves of the gate member.

Unlike the hitherto known gate valves, a gate valve constructed in accordance with the present invention offers high reliablity and long service, as well as easy manufacture and simple operation.

As compared with the hitherto known valves, a gate valve constructed in accordance with the present invention has a reduced weight and is characterized by simplicity of the manufacture and assembling of its component parts, as well as of the gate valve, as a whole.

Furthermore, a gate valve of the herein disclosed structure is an all-purpose one, since it can be mounted within a pipeline or any other flow conduit system, irrespectively of varying properties, parameters and flow direction of the fluid under control.

The degree of the sealing of the flow control assembly of the gate valve at any pressure of the fluid under control (short of the maximally admissible value) is selectable by the operator, and that without any spring means incorporated in the flow control assembly.

Other objects and advantages of the present invention will become apparent from the following detailed description of the invention, with reference being had to the accompanying drawings, wherein:

FIG. 1 is a longitudinally sectional view of a flat direct-flow gate valve according to the invention;

FIG. 2 is an enlarged view of the area A in FIG. 1;

FIG. 3 is a cross-sectional view of the flow control assembly of the gate valve;

Figure 4:
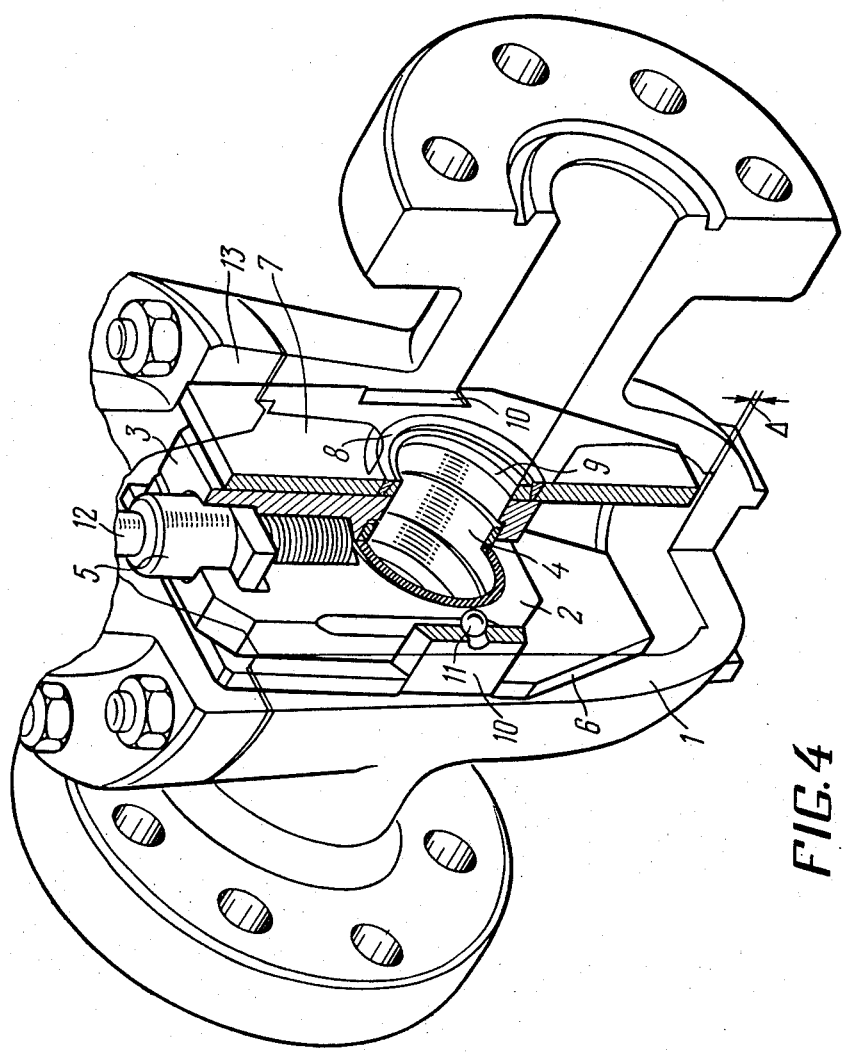
FIG. 4 is a partly cut away perspective view of the gate valve and the flow control assembly thereof.

Referring now in particular to the appended drawings, there is mounted internally of the housing 1 (FIGS. 1 to 4) of the herein disclosed gate valve, between the flat-parallel surfaces adjoining the flow opening, a flow control assembly including a gate member made up by two identical halves 2 and 3 with a centering sleeve 4 mounted therebetween, and a nut 5. At both sides of the gate member, the gaps intermediate the sealing surfaces of the housing 1 and the respective halves 2 and 3 of the gate member have mounted therein protective shields 6 and 7 having each a cylindrical bore adjoining the flow opening of the housing 1, the bore receiving seat means defined by a sealing ring 8 and a thrust ring 9, the rings engaging each other by their tapering surfaces. The sides of the shields 6 and 7 have dovetail grooves cut therein, these grooves receiving therein thrust strips 10 provided with sockets receiving spherical retained means in the form of balls 11. On the other hand, the balls 11 are received in the spaces defined by the respective recesses cut at both sides in the internal edges of the two halves 2 and 3 of the gate member. The length of these recesses is selected to correspond to the working stroke of the two halves 2 and 3 of the gate member, in accordance with the diameter of the flow opening. Toward the opposite ends thereof each such recess has it depth gradually diminishing, so that the recess smoothly merges with the edge of the respective half 2 or 3 of gate member. Therefore, the slits defined by these recessed internal edges of the respective halves 2 and 3 of the gate member gradually narrow toward the ends thereof, corresponding to the opposite extreme working positions of the gate member.

The face end portion of each one of the two halves 2 and 3 of the gate member has a T-shaped slot cut therein, the two slots receiving therein the head of the nut 5. A threaded spindle or screw 12 is threaded through this nut 5, in which way the two halves 2 and 3 of the gate member can be reciprocated in a plane perpendicular to the axis of the flow opening of the housing 1.

Depending on the actually selected driving pattern of the gate member, there is possible an alternative connection between the screw-nut couple made up by the nut 5 and the threaded spindle 12 and the two halves 2 and 3 of the gate member. In this case the T-shaped slots cut in the end portion of the halves 2 and 3 of the gate member receive therein the head of the threaded spindle 12, whereas the nut 5 is threaded onto this spindle.

In the first-described case the spindle 12 is rotated, and the nut 5 is reciprocated together with the gate member; in the other case the nut 5 is rotated to reciprocate the spindle 12 together with the gate member.

After all the abovementioned components of the flow control assembly have been assembled within the housing 1, the latter is closed from above with a bolted lid 13.

To minimize friction between the relatively movable elements of the flow control assembly, as well as to minimize corrosion of these elements under the action of the controlled fluid, the internal space of the housing 1 of the herein disclosed gate valve is filled with solid oil or grease through a nipple means 14 screwed into a conically threaded opening provided in the housing 1 of the gate valve.

The herein disclosed gate valve operates as follows.

With the spindle 12 being rotated clockwise, the nut 5 is translated downwardly together with the two halves 2 and 3 of the gate member, intermediate of the protective shields 6 and 7. During this downward motion the balls 11 received in the respective sockets of the thrust strips 10 and projecting into the slits between the two halves 2 and 3 of the gate member assist in the guiding of the gate member.

The protective shields 6 and 7 having their bottom ends thrusting against the bottom of the housing 1 and also having their top ends thrusting against the lower face of the lid 13, the displacement of these shields is limited by a guaranteed gap or play meant to compensate for any inaccuracy in the manufacture of the components of the flow control assembly within a preset tolerance range. Therefore, the balls 11 received in the sockets in the thrust strips 10 mounted in the respective grooves of the protective shields 6 and 7 can be considered as having a specified fixed position. As the gate member is driven toward either of its two opposite extreme working positions, the slits between the two halves 2 and 3 thereof gradually narrow down, whereby the balls 11 projecting into these slits bias the two halves 2 and 3 of the gate member apart, pressing them against their respective seats defined by the thrust rings 9 and sealing rings 8. Owing to this pressure, the thrust rings 9 mounted at both sides of the gate member inflict deformation of the sealing rings 8, thus taking up any gaps that might be left between the engaging surfaces of these sealing rings 8 and of the respective halves 2 and 3 of the gate member, as well as those left between the sealing surfaces of the housing 1 and the respective bores of the protective shields 6 and 7.

In this way adequate fluid-tightness of the flow control member of the herein disclosed gate valve is attained.

With the spindle 12 being now rotated in the opposite direction, the two halves 2 and 3 of the gate member are raised, the slits therebetween gradually widening, whereby the balls 11 relieve their wedging action that biases the two halves apart, and the gate member slides upwardly without any excessive friction, until the slits between the two halves 2 and 3 of the gate member start narrowing once again, as the gate member approaches its topmost working position.

With the gate member being in the last-mentioned position, the flow opening thereof coincides with that of the housing 1 of the herein disclosed gate valve, and the balls 11 bias the two halves 2 and 3 of the gate member apart in the manner that has been already described hereinabove, pressing the seat means against the housing 1, and thus a sealed direct flow passage is effected through the herein disclosed gate valve.

What is claimed is:

1. A flat direct-flow gate valve with a flow control assembly, comprising: a housing having a flow opening and sealing surfaces; a gate member made up of two identical halves having each a flow opening, mounted within said housing for reciprocation between two extreme working positions; said two halves adjacent to said respective flow openings thereof receiving therebetween a centering sleeve; protective shields mounted within said housing intermediate of said sealing surfaces thereof and said halves of said gate member; each said shield having a bore cut therein, adjoining said flow opening of said housing; seat means including thrust rings and sealing rings, received within said bore; means guiding the motion of said gate member, said means being defined by spherical retained means supported by the respective ones of said shields and slits left between the respective internal edges of said halves of said gate member, each said slit gradually narrowing toward the respective ends thereof corresponding to said extreme working positions of said gate member, in which said positions said retainer means bias said halves of said gate member apart, whereby the latter exert pressure upon said seat means and thus assist in hermetization of the flow control assembly of said gate valve.

2. A flat direct-flow gate valve, as claimed in claim 1, wherein said protective shields have mounted therein thrust strips with sockets, so that each said gate guiding means is defined by a ball freely received in the respective one of said sockets and by recesses cut in the respective internal edges of said halves of said gate member, the length of each said recess corresponding to the working stroke of said gate member between said two extreme working positions thereof, said recesses having their depth gradually diminishing toward the opposite ends thereof, corresponding to said extreme working positions, which amounts to gradual narrowing of said slits between said two halves of said gate member.

* * * * *